US010915648B1

(12) United States Patent
Beyo et al.

(10) Patent No.: US 10,915,648 B1
(45) Date of Patent: Feb. 9, 2021

(54) ENRICHMENT OF DATABASE LOGS

(71) Applicant: Imperva, Inc., Redwood City, CA (US)

(72) Inventors: Gabriel Beyo, Modiin (IL); Assaf Cohen, Rishon-le-zion (IL); Eytan Naim, Modiin (IL)

(73) Assignee: Imperva, Inc., San Mateo, CA (US)

( * ) Notice: Subject to any disclaimer, the term of this patent is extended or adjusted under 35 U.S.C. 154(b) by 0 days.

(21) Appl. No.: 15/929,253

(22) Filed: Apr. 3, 2020

(51) Int. Cl.
*G06F 21/62* (2013.01)
*G06F 16/23* (2019.01)

(52) U.S. Cl.
CPC ...... *G06F 21/6218* (2013.01); *G06F 16/2365* (2019.01)

(58) Field of Classification Search
CPC .................. G06F 16/2365; G06F 21/6218
USPC ........................................... 707/781
See application file for complete search history.

(56) References Cited

U.S. PATENT DOCUMENTS

| | | | | |
|---|---|---|---|---|
| 8,306,945 B2* | 11/2012 | Morris | .................. | G06F 11/079 707/603 |
| 9,633,106 B1* | 4/2017 | Saurabh | ................ | G06F 16/355 |
| 9,917,853 B2* | 3/2018 | Seigel | ................. | H04L 63/1425 |
| 10,467,117 B2* | 11/2019 | Wilding | .............. | G06F 11/3075 |
| 10,592,327 B2* | 3/2020 | Hotta | .................. | G06F 11/0709 |
| 10,733,180 B2* | 8/2020 | Demla | .............. | G06F 16/24568 |
| 10,748,070 B2* | 8/2020 | Rajagopalan | .......... | G06Q 10/00 |
| 2008/0184058 A1* | 7/2008 | McDermott | ........... | G06Q 20/40 714/2 |
| 2009/0106746 A1* | 4/2009 | Chaudhuri | ................ | G06F 8/20 717/158 |
| 2010/0223446 A1* | 9/2010 | Katariya | ............. | G06F 11/3636 712/220 |
| 2014/0082513 A1* | 3/2014 | Mills | ..................... | H04L 41/069 715/744 |
| 2016/0301561 A1* | 10/2016 | Petersen | ................. | H04L 67/10 |
| 2017/0034010 A1* | 2/2017 | Fong | ...................... | H04L 41/20 |

* cited by examiner

*Primary Examiner* — Robert Stevens
(74) *Attorney, Agent, or Firm* — Nicholson De Vos Webster & Elliott LLP

(57) ABSTRACT

A method by a network device for providing contextual information for database logs. The method includes detecting that a process executing on the network device has created a database connection to a database server, determining a process ID of the process that created the database connection to the database server, determining contextual information using the process ID of the process, generating a key associated with the database connection based on information that is known to be included in a database log of the database, and providing the key and the contextual information to a correlator component, which is to correlate information included in the database log of the database with the contextual information based on the key to generate an enriched database log that correlates the information included in the database log with the contextual information.

20 Claims, 7 Drawing Sheets

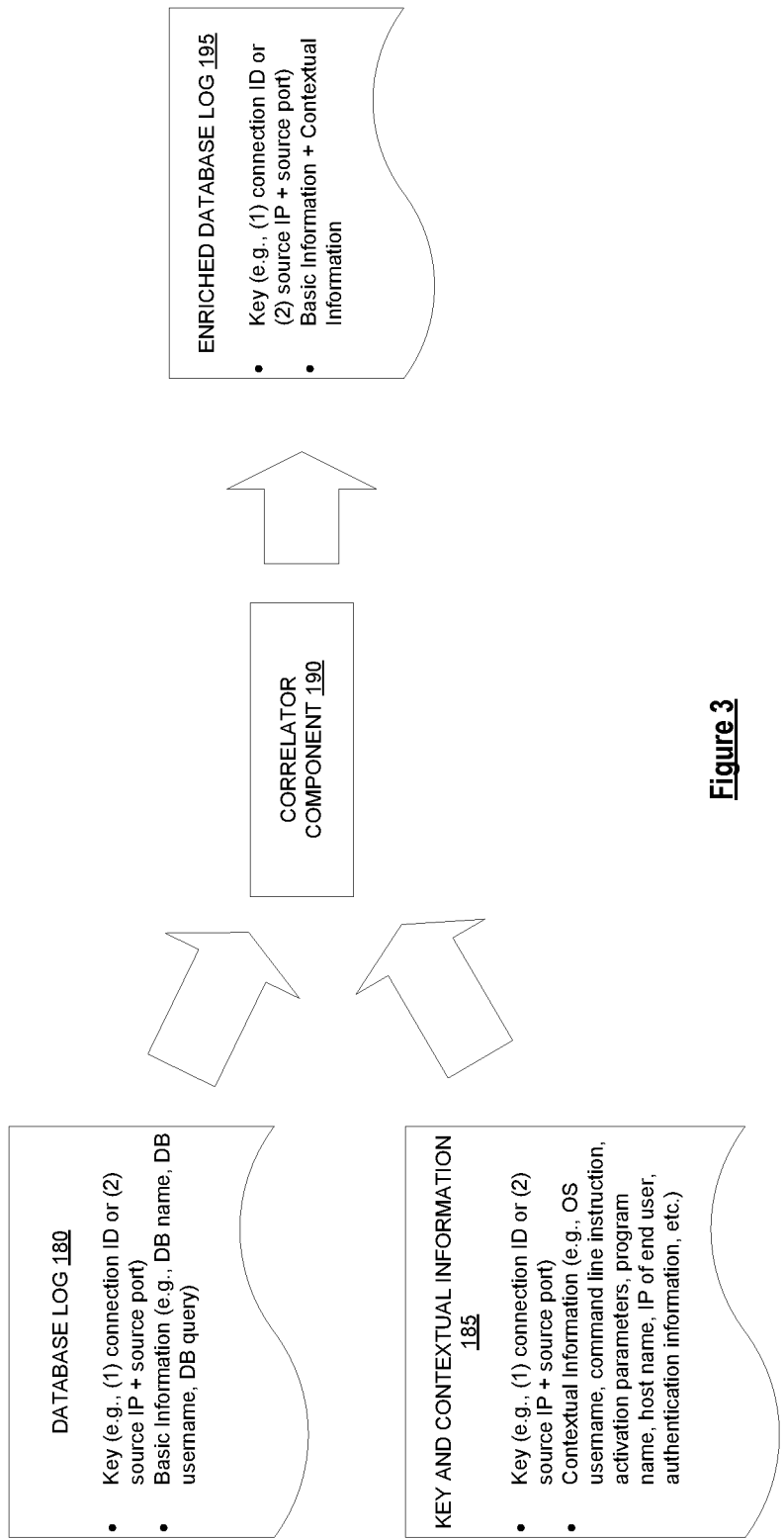

| db_instance_name | db_engine | region | event_type | stream_id | event_id | log_timestamp | db_user_name | log_database_name | client_host_address | os_user_name | application_name | error_code |
|---|---|---|---|---|---|---|---|---|---|---|---|---|
| dataB1 | mysql | us-east-1 | QUERY | 100 | 10000 | 5090000 | dataB1_u | dataB1 | 10.0.0.0 | john.due | root | /usr/bin/mysql | 0 |
| dataB2 | mysql | us-east-1 | QUERY | 200 | 10001 | 5090000 | dataB2_u | dataB2 | 10.0.0.1 | john.due | root | /usr/bin/mysql | 0 |
| dataB3 | mysql | us-east-1 | QUERY | 300 | 10002 | 5090000 | dataB3_u | dataB3 | 10.0.0.2 | john.due | root | /usr/bin/mysql | 0 |
| dataB4 | mysql | us-east-1 | QUERY | 400 | 10003 | 5090000 | dataB4_u | dataB4 | 10.0.0.3 | john.due | root | /usr/bin/mysql | 0 |
| dataB5 | mysql | us-east-1 | QUERY | 500 | 10004 | 5090000 | dataB5_u | dataB5 | 10.0.0.4 | john.due | root | /usr/bin/mysql | 0 |
| dataB6 | mysql | us-east-1 | QUERY | 600 | 10005 | 5090000 | dataB6_u | dataB6 | 10.0.0.5 | john.due | root | /usr/bin/mysql | 0 |

KEY 410

CONTEXTUAL INFORMATION 420

| normalized_query | query_group_operation | sql_objects | command_line_arguments |
|---|---|---|---|
| show tables | showtables | | mysql -h db1.com -u db1u -p |
| show databases | showdatabases | | mysql -h db1.com -u db1u -p |
| select * from mydb where name='john' | select | | mysql -h db1.com -u db1u -p |

CONTEXTUAL INFORMATION 420

Figure 4

ENRICHMENT OF DATABASE LOGS

TECHNICAL FIELD

Embodiments of the invention relate to the field of database security, and more specifically, to enriching database logs with contextual information.

BACKGROUND ART

Database servers are computer programs that provide database services to database clients. Many web applications utilize database servers (e.g., database servers that host relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to submit ad-hoc or defined queries (often using Structured Query Language (SQL)) to the database server. Database servers typically store data using one or more databases. Thus, in some instances a database server can receive a database query from a database client, execute the database query using data stored in the set of one or more database objects (e.g., a table in a relational database) of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may include one or more database objects that are managed by a Database Management System (DBMS). Each database object may include a number of records, and each record may include a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

Enterprises (e.g., businesses, organizations, groups, governmental bodies, or other collective bodies) often use databases to store various data pertaining to those enterprises, some of which may be highly sensitive (e.g., credit card numbers of customers, social security numbers of customers, etc.). Thus, enterprises may monitor the database activity of its databases using database monitoring techniques. Database monitoring techniques typically generate database logs that provide certain information regarding the database operations performed on the databases. These database logs may be used for a variety of purposes such as meeting regulation and compliance standards for sensitive data accesses (for some enterprises logging data operations performed on their databases is a legal requirement), helping with security incident investigations and incident responses, and/or detecting anomalous data accesses.

BRIEF DESCRIPTION OF THE DRAWINGS

The invention may best be understood by referring to the following description and accompanying drawings that are used to illustrate embodiments of the invention. In the drawings:

FIG. 3 is a diagram illustrating the inputs and output of the correlator component, according to some embodiments.

FIG. 4 is a diagram illustrating a database log enriched with contextual information, according to some embodiments.

DETAILED DESCRIPTION

Figure 1:
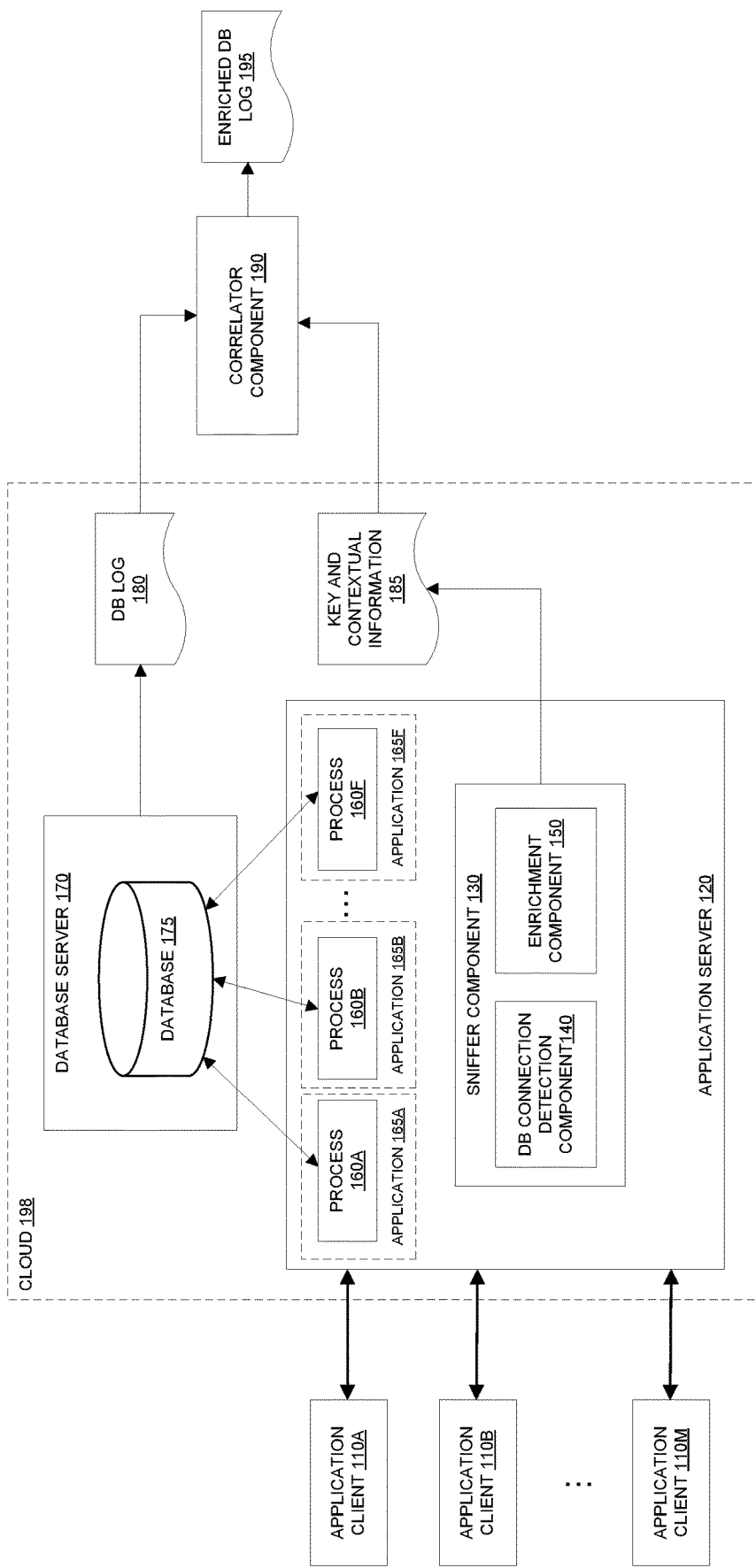
FIG. 1 is a block diagram illustrating a system in which database logs can be enriched with contextual information, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, application programming interface (API) servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

As mentioned above, enterprises (e.g., businesses, organizations, groups, governmental bodies, or other collective bodies) often use databases to store various data pertaining to those enterprises, some of which may be highly sensitive (e.g., credit card numbers of customers, social security numbers of customers, etc.). Thus, enterprises may/must monitor the database activity of its databases using database monitoring techniques. Database monitoring techniques typically generate database logs that provide certain information regarding the database operations performed on the databases. These database logs may be used for a variety of purposes such as meeting regulation and compliance standards for sensitive data accesses, helping with security incident investigations and incident responses, and/or detecting anomalous data accesses.

Database logs typically include information regarding the database operations performed on databases such as the database name of the database on which the database operation was performed, the database user name of the database user that performed the database operation (sometimes referred to as database account name), the database query that was submitted/executed (which may indicate the database operation performed, the database table on which the database operation was performed, etc.). Some database logs also include information regarding the database clients that performed the database operations (which may be referred to as database client information) such as the host name of the host implementing the database client, the IP address associated with the database client, the application name associated with the database client (sometimes referred to as the source application name, source tool name, or program name), the operating system (OS) user name associated with database client, and other information/metadata (e.g., the database driver that the database client used, the command line instruction that caused the database client to be run, the OS associated with the database client, authentication information, etc.).

The database client information is sometimes (but rarely) communicated on the protocol between the database clients and the database server and can be extracted by the database server or an agent installed on the database server for the purpose of enriching the database logs with the database client information. However, different environments/deployments may include different subsets of database client information in the database logs. Moreover, even when database client information is communicated through the protocol, the native database logging mechanisms may not include that information in the database logs. As a result, any database audit mechanisms that rely on the native database logs are completely blind to this valuable database client information. The problem is even more acute in certain cloud database deployments (e.g., Amazon® Relational Database Service (RDS)) because the cloud database provider may decide what information is communicated in their protocols and what information to log and what information to ignore.

In some cases, a server may execute multiple processes and each of these processes may perform database operations on a database. For example, an application server may execute multiple processes, where each process is an instance of an application hosted by the application server (e.g., this is common in cloud-computing platforms such as Amazon® Elastic Compute Cloud (EC2) or Google® Cloud Platform). However, in this case, there is no way to determine from the database logs which applications/processes performed which database operations (e.g., because the host name or source IP address in the database log will be that of the application server for all of the database operations performed by the applications/processes). As another example, a jump server that manages/controls access to a database server may execute multiple processes on behalf of multiple end users accessing the database server. However, in this case, if multiple end users use the same database credentials (e.g., same database user name), there is no way to determine from the database logs which end user is behind which database operations (because the database user name in the database log will be the same for all of the end users and the host name and source IP address in the database log will be that of the jump server for all of the database operations performed by the end users).

Conventional techniques to capture database client information rely on installing agents on or near the client end stations implementing the database clients, which is cumbersome to deploy (e.g., because it requires installing agents on a large number of client end stations), and/or rely on installing agents on the server end station implementing the database server, which is not always possible (e.g., if the database server is hosted by a third-party cloud database provider). Further, agents installed on the server end station implementing the database server may only be useful for capturing information about local database traffic (e.g., database traffic that originates from the same server end station on which the database server is implemented) and not be able to capture information about remote database traffic (e.g., database queries submitted from a distinct server) such as which operating system (OS) user submitted the database query.

Techniques are disclosed herein for enriching database logs with contextual information. According to some embodiments, a sniffer component is installed on a server (e.g., an application server or jump server) executing one or more processes that may each create database connections to a database server. The sniffer component may detect when a process executing on the server creates a database connection to the database server. If the sniffer component detects that a process has created a database connection to the database server, it may determine the process ID of the process and determine contextual information using the process ID. For example, the contextual information may include information about the process such as the OS user name associated with the process, a command line instruction that caused the process to be executed, one or more activation parameters associated with the process (e.g., parameters that were included in the command line instruction that caused the process to be executed), the application name associated with the process, the host name of the host executing the process, and authentication information. In addition, the sniffer component may generate a key associated with the database connection based on information that is known to be included in a database log of a database. The key may be generated such that it can be used to determine which database operations recorded in the database log are associated with the database connection. For example, the key may be generated based on a connection ID associated with the database connection or the source IP address and source port associated with the database connection. The sniffer component may then provide the key and the contextual information to a correlator component. The correlator component may then correlate information included in the database log of the database with the contextual information based on the key to generate an enriched database log that correlates the information included in the database log with the contextual information. Embodiments are further described herein with reference to the accompanying figures.

FIG. 1 is a block diagram illustrating a system in which database logs can be enriched with contextual information, according to some embodiments. As shown in the diagram, the system includes application clients 110A-M communicatively coupled to application server 120, a database server 170, and a correlator component 190. The application server 120 may host one or more applications 165A-F that are made accessible to the application clients 110A-M. For example, the applications 165 hosted by the application server 120 may include a web application that is designed to dynamically generate web pages responsive to requests sent by the application clients 110A-M. Each of the application clients 110A-M may be implemented by one or more client end stations and the application server 120 may be implemented by one or more server end stations.

The application server 120 may execute processes 160A-F to implement the application(s) 165 hosted by the application server. For example, as shown in the diagram, the application server 120 may execute process 160A to implement application 165A, execute process 160B to implement application 165B, and execute process 160F to implement application 165F. Each process 160 may be an instance of its corresponding application 165. Each of the processes 160A-F may create one or more database connections to the database server 170 to perform database operations on a database 175 hosted by the database server 170 (e.g., as part of processing requests from the application clients 110A-M). For example, a process 160 may create a database connection to the database server 170 and send database queries over the database connection to the database server 170 to perform database operations (e.g., create, read/query, update, and delete (CRUD) operations) on the database 175. In this regard, the processes 160A-F may be considered to be database clients.

The database server 170 may generate a record of the database operations performed on the database 175 in the form of a database (DB) log 180. The database log 180 of the database 175 may include various information regarding the database operations performed on the database 175. For example, in one embodiment, the database log 180 of the database 175 includes, for each database operation performed on the database 175, the database name of the database on which that database operation was performed, the database user name of the database user that performed that database operation, and/or information regarding the database query that was submitted/executed. The database server 170 may provide the database log 180 of the database 175 to the correlator component 190. The database log 180 of the database 175 may be provided to the correlator component 190 periodically (e.g., every hour), when the database log 180 reaches a certain size, on demand (e.g., in response to a request from the correlator component 190), or using other type of cadence. As will be described in additional detail herein below, the correlator component 190 may correlate information included in the database log 180 with contextual information to generate an enriched database log 195. The database server 170 may be implemented by one or more server end stations. While the diagrams show the database server 170 hosting a single database 175, it should be understood that in other embodiments the database server 170 may host more than one database.

As shown in the diagram, the application server 120 includes a sniffer component 130 that includes a database (DB) connection detection component 140 and an enrichment component 150. The database connection detection component 140 may detect when a process 160 executing on the application server 120 creates a database connection to the database server 170. If the database connection detection component 140 detects that a process 160 executing on the application server 120 has created a database connection to the database server 170, it may determine the process ID of that process 160 (e.g., by making a request to the OS). The process ID of a process 160 may be a number or string used by an operating system to uniquely identify an active process or a similar identifier. The database connection detection component 140 may then provide an indication of the database connection and the process ID of the process 160 to the enrichment component 150.

The enrichment component 150 may generate a key associated with the database connection based on information that is known to be included in a database log 180 of the database 175. The key may be generated such that it can be used to determine which database operations recorded in the database log 180 are associated with the database connection. As will be described further herein below, the key may be used to correlate information included in the database log 180 of the database 175 with contextual information. Different database implementations may generate database logs containing different types of information. As such, the enrichment component 150 may generate keys differently for different database implementations. For example, MySQL database logs typically include the connection ID of the database connection, whereas PostgreSQL database logs typically do not include the connection ID but include the source Internet Protocol (IP) address and source port associated with the database connection. In one embodiment (e.g., an embodiment where the connection ID is included in the database log 180), the key associated with a database connection is generated based on the connection ID associated with the database connection. In another embodiment (e.g., an embodiment where source IP address and source port are included in the database log 180), the key associated with a database connection is generated based on the source IP address and source port associated with the database connection. In one embodiment, the enrichment component 150 determines the source IP address and source port associated with the database connection based on sniffing the Transmission Control Protocol (TCP) connection to the database server 170. While a few ways to generate the key has been described above, it should be understood that the key may be generated based on various different types of information. For example, the key may be generated based on the connection ID, the source IP address, the source port, the instance ID (e.g., an Amazon Web Services (AWS) instance ID), the host name, the host IP address, the query timestamp, the OS user name, or any combination thereof.

In some cases, the connection ID or source IP/port combination alone may not be sufficient to distinguish between different database connections. This may be the case, for example, if the connection ID or source IP/port combination is not unique across different database instances (e.g., e.g., different database connections to different database instances may use the same connection ID). Thus, in one embodiment, the key associated with a database connection is further generated based on a database instance ID. In one embodiment, the database instance ID is generated based on a host name of a host on which the database server is hosted.

The enrichment component 150 may also determine contextual information using the process ID of the process 160. In one embodiment, the contextual information includes one or more of the operating system (OS) user name associated with the process 160, a command line instruction that caused the process 160 to be executed, one or more activation parameters associated with the process 160 (e.g., parameters that were included in the command line instruction that caused the process 160 to be executed), the application name associated with the process 160, the host name of the host executing the process 160, and authentication information. The sniffer component 130 may then provide the key and contextual information 185 to the correlator component 190 (this contextual information is said to be associated with the key).

The sniffer component 130 may perform similar operations as described above for each detected database connection to send the key associated with the database connection and associated contextual information 185 to the correlator component 190.

The correlator component 190 may correlate information included in the database log 180 of the database 175 with the contextual information based on the key to generate an enriched database log 195. For example, if the key is generated based on connection ID, then the correlator component 190 may correlate information included in the database log 180 that is associated with a given connection ID (e.g., log entries specifying the given connection ID) with the contextual information associated with the given connection ID to generate the enriched database log 195. As another example, if the key is generated based on source IP address and port, then the correlator component 190 may correlate information included in the database log 180 that is associated with a given source IP address and port with the contextual information associated with the given source IP address and port to generate the enriched database log 195. The correlator component 190 may perform similar correlations for each unique key value (e.g., for each unique connection ID or for each unique source IP address and port combination). As a result, the enriched database log 195 may include the basic information included in the native database log 180 that is correlated with contextual information provided by the sniffer component 130. The correlator component 190 may be implemented by one or more network devices.

One or more components of the system may be deployed in a cloud 198. For example, as shown in the diagram, the application server 120 and the database server 170 may be deployed in the cloud 198 (e.g., the application server 120 may correspond to an Amazon Elastic Compute Cloud (EC2) machine and the database server 170 may correspond to an Amazon Relational Data Service (RDS) machine). In one embodiment, the correlator component 190 may be deployed in a cloud.

While FIG. 1 shows an embodiment in which the sniffer component 130 is installed on an application server 120, it should be understood that the sniffer component 130 can be installed on other types of servers or devices to provide contextual information for database logs. For example, as shown in FIG. 2 and described below, the sniffer component 130 may be installed on a jump server 220 to provide contextual information for database logs.

Figure 2:
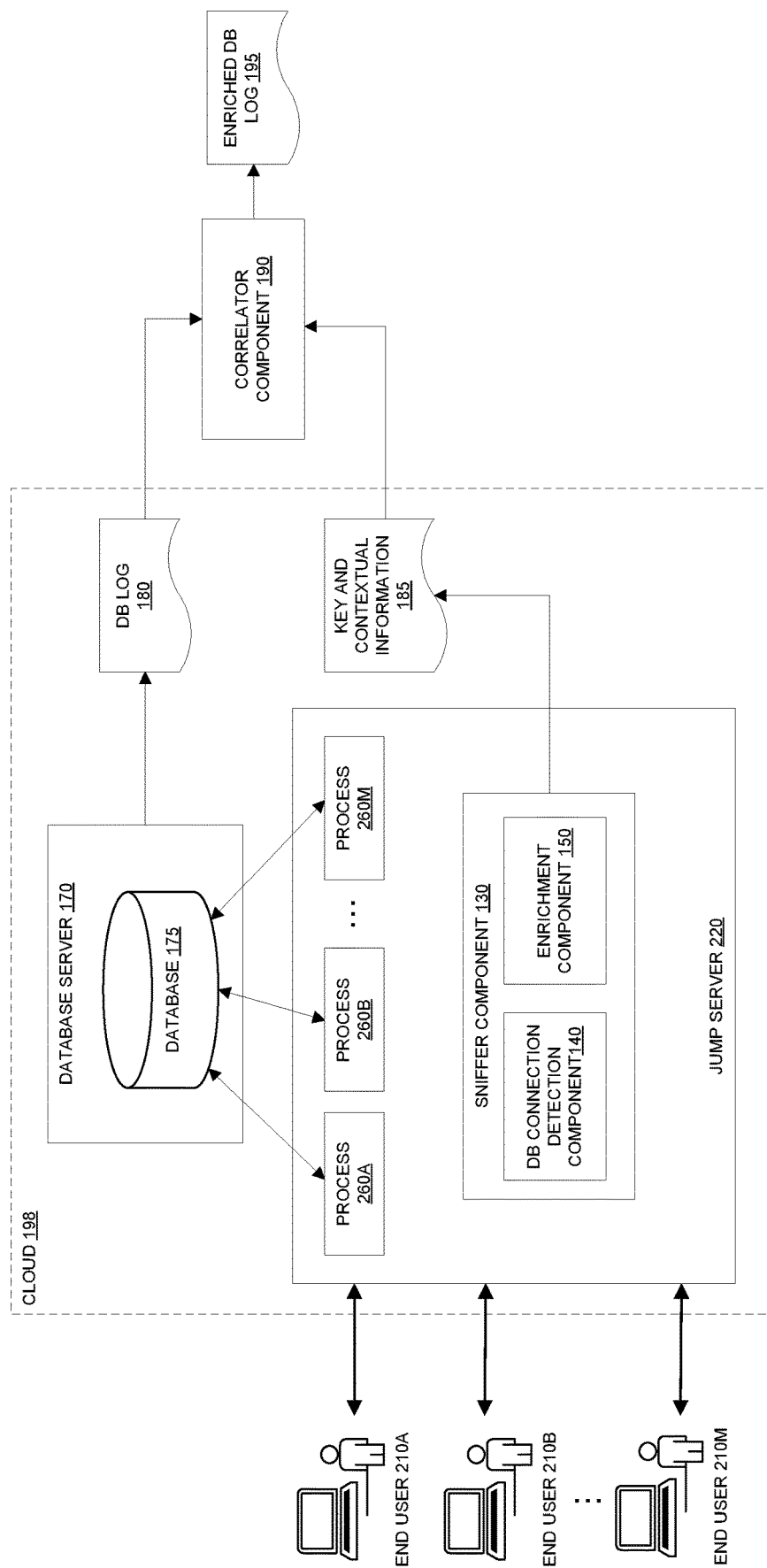
FIG. 2 is a block diagram illustrating another system in which database logs can be enriched with contextual information, according to some embodiments.

FIG. 2 is a block diagram illustrating another system in which database logs can be enriched with contextual information, according to some embodiments. As shown in the diagram, the system includes end users 210A-M communicatively coupled to jump server 220, a database server 170, and a correlator component 190. The system shown in FIG. 2 includes several of the same components included in the system shown in FIG. 1 which operate in a similar fashion as described above. As such, the following description will aim to highlight the notable differences between the systems while avoiding repetition where possible for the sake of conciseness. The end users 210A-M may use their respective client end stations to access the database server 170 via the jump server 220. For example, end users 210A-M may remotely login to the jump server 220 (e.g., using secure shell (SSH) or similar protocol) and execute processes 260A-M on the jump server 220 that can create database connections to the database server 170 on their behalf. The jump server 220 may be used to provide security between different security zones (e.g., the end users 210A-M and the database server 170 may be in different security zones and the jump server 220 manages/control accesses by the end users 210 to the database server 170).

Each of the processes 260A-M may create one or more connections to the database server 170 to perform database operations on a database 175 hosted by the database server 170 on behalf of an end user 210. For example, process 260A may create a database connection to the database server 170 and send database queries over the database connection to the database server 170 to perform database operations on the database 175 on behalf of end user 210A, process 260B may create a database connection to the database server 170 and send database queries over the database connection to the database server 170 to perform database operations on the database 175 on behalf of end user 210B, and so forth. In this regard, the processes 260A-M may be considered to be database clients.

As described above with reference to FIG. 1, the database server 170 may generate a record of the database operations performed on the database 175 in the form of a database log 180 and provide this database log 180 to the correlator component 190.

As shown in the diagram, the jump server 220 includes a sniffer component 130 that includes a database connection detection component 140 and an enrichment component 150. The connection detection component 140 may detect when a process 260 executing on the jump server 220 creates a database connection to the database server 170 and determine the process ID of that process 260 (e.g., by making a request to the OS). The database connection detection component 140 may then provide the process ID of the process 260 to the enrichment component 150.

The enrichment component 150 may generate a key associated with the database connection based on information that is known to be included in the database log 180 of the database 175. The enrichment component 150 may also determine contextual information using the process ID of the process 260. As mentioned above, the contextual information may include the OS user name associated with a process 260. In a jump server scenario, the OS user name associated with a process 260 may be particularly valuable as it may represent/indicate the end user 210 behind the process 260 (even if multiple end users use the same database credentials (e.g., same database user name) to perform database operations on the database 175). As mentioned above, the contextual information may include authentication information. In a jump server scenario, this authentication information may include the SSH logs and/or an authentication key used). In one embodiment, the contextual information includes the IP address associated with the end user 210. The enrichment component 150 may then provide the key and the contextual information 185 to the correlator component 190.

As described above with reference to FIG. 1, the correlator component 190 may correlate information included in the database log 180 of the database 175 with the contextual information based on the key to generate an enriched database log 195 (which includes the basic information included in the native database log 180 that is correlated with contextual information provided by the sniffer component 130).

One or more components of the system may be deployed in a cloud 198. For example, as shown in the diagram, the jump server 120 and the database server 170 may be deployed in the cloud 198. In one embodiment, the correlator component 190 may be deployed in a cloud.

Embodiments may provide several technical advantages. For example, a technical advantage is that embodiments allow for enriching database logs with contextual information that is typically not available to the database server 170 (and cannot be obtained even by an agent installed on the database server 170). The enrichment can be provided for different database implementations (e.g., a MySQL database implementation or PostgreSQL database implementation) and can be provided regardless of the protocol used between the server (e.g., application server or jump server) and the database server. Also, deployment is simpler and less intrusive compared to conventional techniques because embodiments can be deployed by installing a sniffer component 130 at a single location (e.g., on the application server 120 or jump server 220) (in contrast to some conventional techniques that require installing agents on multiple client end stations or even installing agents on each application (e.g., installing an agent on each Java server)) and do not require access to the database server 170 (e.g., in contrast to some conventional techniques that require installing an agent on the server end station implementing the database server 170, which is not always possible due to access/permission issues).

While a certain arrangement of components and distribution of functionality is shown in the diagrams, it should be understood that this is merely provided by way of example, and that other embodiments may have more or less components, arrange the components differently, and/or distribute functionality among the components differently.

FIG. 3 is a diagram illustrating the inputs and output of the correlator component, according to some embodiments. As shown in the diagram, the correlator component 190 receives as input a database log 180 and key and contextual information 185. The database log 180 may include key information (e.g., (1) a connection ID or (2) a source IP address and a source port) (since the key was generated by the sniffer component 130 based on information that is known to be included in the database log 180) and basic information (e.g., database name, database user name, database query) for each of one or more database operations performed on the database 175. The key and contextual information 185 may include a key and contextual information (e.g., OS user name, command line instruction, activation parameters, program name, host name, IP of end user, authentication information, etc.) for each database connection or unique key value (e.g., for each connection ID or for each source IP/port). The correlator component 190 may correlate the basic information included the database log 180 and the contextual information 185 based on the keys to generate as output an enriched database log 195, which includes the key, the basic information, and the contextual information for each database operation (where the basic information and contextual information are correlated based on matching keys).

FIG. 4 is a diagram illustrating a database log enriched with contextual information, according to some embodiments. The database log is represented in the diagram as a table, where each row represents a log entry and each column represents an attribute. As shown in the diagram, the database log includes attributes for basic information (e.g., db_instance_name, db_engine, region, event_type, stream_id, log_timestamp, db_user_name, log_database_name, client_host_address, error_code, normalized_query, query_group_operation_sql, and sql_objects). Also, the database log notably includes an attribute that serves as the key 410 (e.g., event_id, which may be a form of a connection ID) and attributes for contextual information 420 (e.g., os_user_name (to indicate the OS user name), application_name (to indicate the application name), and command_line_arguments (to indicate the command line instruction).

Figure 5:
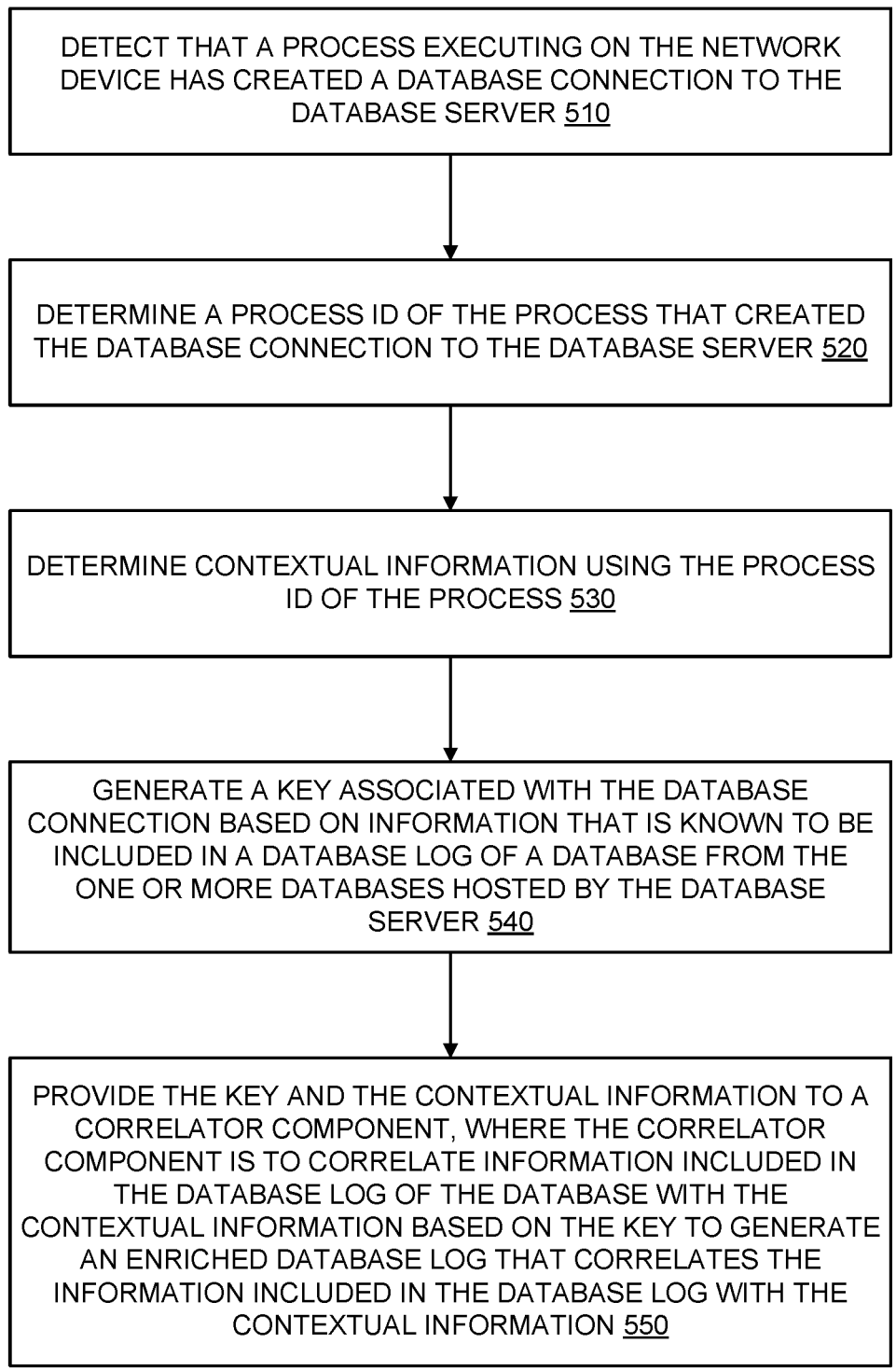
FIG. 5 is a flow diagram illustrating a process for providing contextual information for database logs, according to some embodiments.

FIG. 5 is a flow diagram illustrating a process for providing contextual information for database logs, according to some embodiments. In one embodiment, the process is implemented by a network device that is communicatively coupled to a database server hosting one or more databases. The process may be implemented using any combination of hardware, software, and firmware. The operations in the flow diagrams are described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams. Also, while the flow diagrams show a particular order of operations performed by certain embodiments, it should be understood that such order is provided by way of example (e.g., alternative embodiments may perform the operations in a different order, combine certain operations, overlap certain operations, etc.).

In one embodiment, the process is initiated at block 510 when the network device detects that a process executing on the network device has created a database connection to the database server. In one embodiment, the network device implements an application server, where the application server executes a plurality of processes that create database connections to the database server to serve application clients. In one embodiment, the network device implements a jump server and the process is executed by the jump server on behalf of an end user that is to access the database server via the jump server.

At block 520, the network device determines a process ID of the process that created the database connection to the database server.

At block 530, the network device determines contextual information using the process ID of the process. In one embodiment, the contextual information includes one or more of: an OS user name associated with the process, a command line instruction that caused the process to be executed, one or more activation parameters associated with the process, an application name associated with the process, a host name of a host executing the process, and authentication information. In an embodiment where the network device implements a jump server, the contextual information may include an IP address associated with the end user behind the process.

At block 540, the network device generates a key associated with the database connection based on information that is known to be included in a database log of a database from the one or more databases hosted by the database server. In one embodiment, the key is generated based on a connection ID associated with the database connection. In one embodiment, the key is generated based on a source IP address and source port associated with the database connection. In one embodiment, the key is further generated based on a database instance ID (e.g., in addition to the connection ID or the source IP address and source port). In one embodiment, the database instance ID is generated based on a host name of a host on which the database server is hosted.

At block 550, the network device provides the key and the contextual information to a correlator component, where the correlator component is to correlate information included in the database log of the database with the contextual information based on the key to generate an enriched database log that correlates the information included in the database log with the contextual information. In one embodiment, the information included in the database log of the database includes a database name of the database, a database user name of a database user, and information regarding a database query submitted by the database user.

The operations of blocks 510-550 may be repeated each time a process executing on the network device creates a database connection to the database server.

Figure 6:
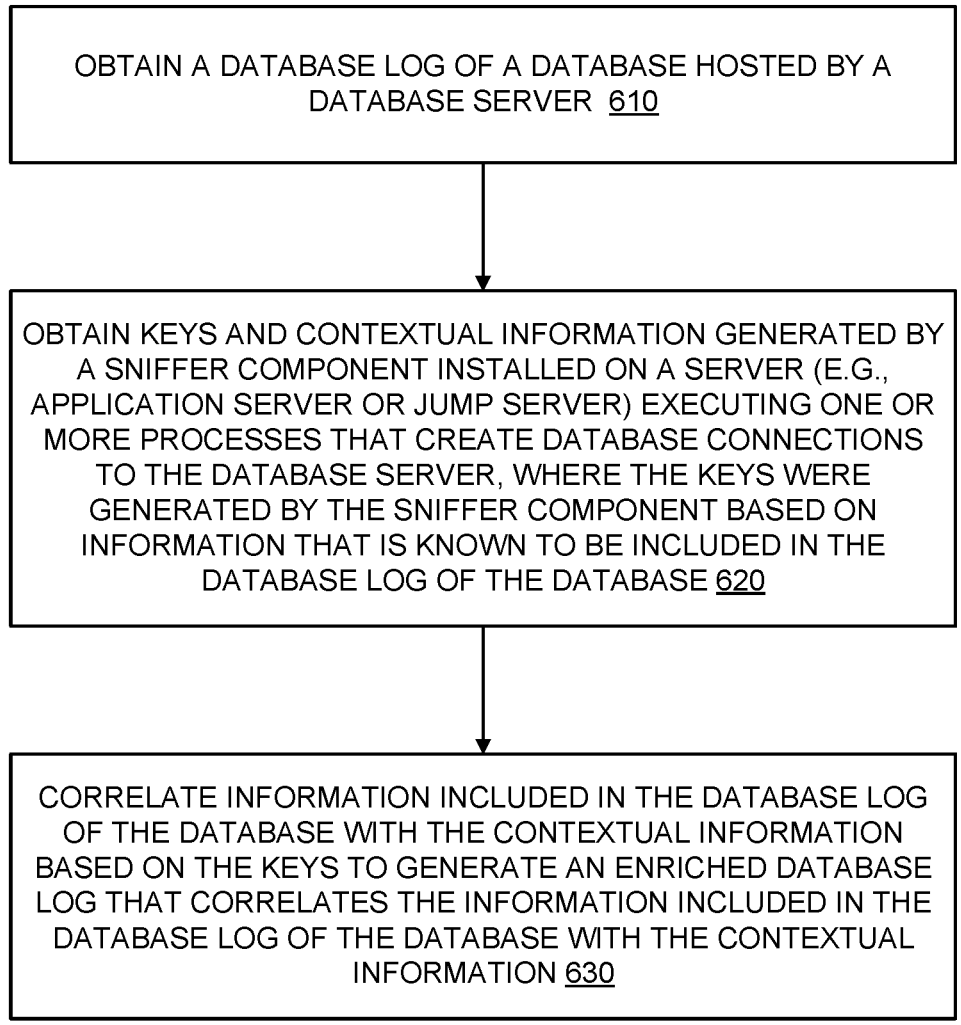
FIG. 6 is a flow diagram illustrating a process for correlating information included in a database log and contextual information, according to some embodiments.

FIG. 6 is a flow diagram illustrating a process for correlating information included in a database log and contextual information, according to some embodiments. In one embodiment, the process is implemented by a network device (e.g., implementing a correlator component). The process may be implemented using any combination of hardware, software, and firmware.

In one embodiment, the process is initiated at block 610 when the network device obtains a database log of a database hosted by a database server.

At block 620, the network device obtains keys and contextual information generated by a sniffer component installed on a server (e.g., an application server or a jump server) executing one or more processes that create database connections to the database server, where the keys were generated by the sniffer component based on information that is known (by the sniffer component) to be included in the database log of the database.

At block 630, the network device correlates information included in the database log of the database with the contextual information based on the keys to generate an enriched database log that correlates the information included in the database log of the database with the contextual information.

Figure 7:
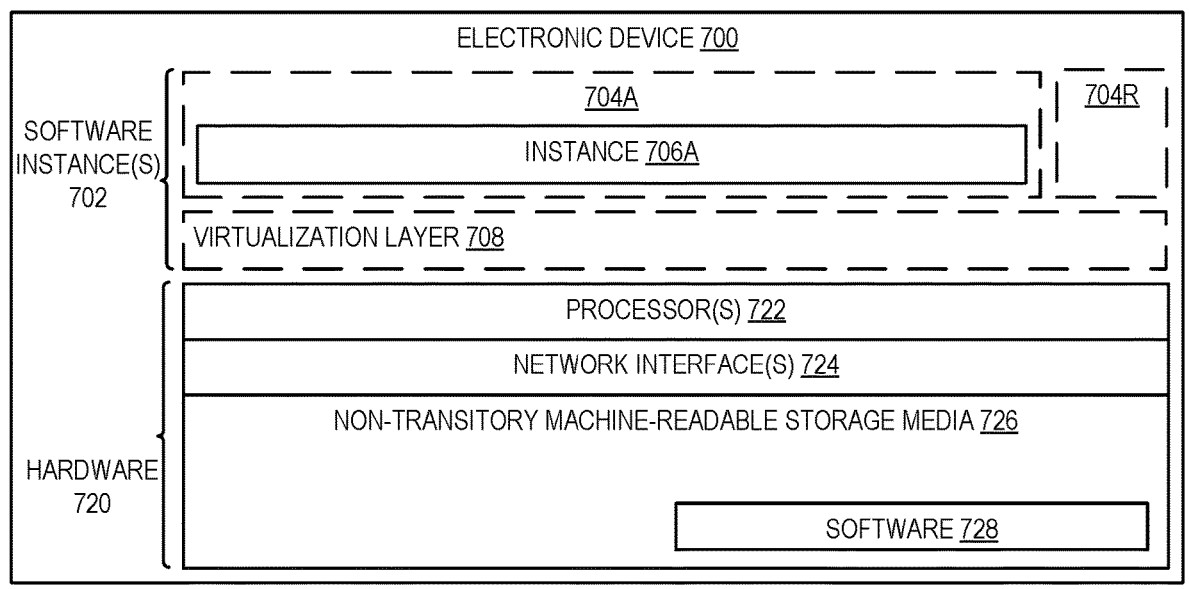
FIG. 7 is a block diagram illustrating an electronic device, according to some embodiments.

FIG. 7 is a block diagram illustrating an electronic device, according to some embodiments. FIG. 7 illustrates hardware 720 comprising a set of one or more processor(s) 722, a set of one or more network interfaces 724 (wireless and/or wired), and non-transitory machine-readable storage medium/media 726 having stored therein software 728 (which includes instructions executable by the set of one or more processor(s) 722). Software 728 can include code, which when executed by hardware 720, causes the electronic device 700 to perform operations of one or more embodiments described herein (e.g., operations for enriching database logs with contextual information). Thus, the sniffer component 130 and the correlator component 190 may each be implemented by one or more electronic devices.

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a network device for providing contextual information for database logs, wherein the network device is communicatively coupled to a database server hosting one or more databases, the method comprising:
    detecting that a process executing on the network device has created a database connection to the database server;
    determining a process ID of the process that created the database connection to the database server in response to detecting that the process has created the database connection;
    determining contextual information using the process ID of the process;
    generating a key associated with the database connection based on information that is known to be included in a database log of a database from the one or more databases hosted by the database server; and
    providing the key and the contextual information to a correlator component, wherein the correlator component is to correlate information included in the database log of the database with the contextual information based on the key to generate an enriched database log that correlates the information included in the database log with the contextual information.

2. The method of claim 1, wherein the key is generated based on a connection ID associated with the database connection.

3. The method of claim 2, wherein the key is further generated based on a database instance ID.

4. The method of claim 3, wherein the database instance ID is generated based on a host name of a host on which the database server is hosted.

5. The method of claim 1, wherein the key is generated based on a source Internet Protocol (IP) address and source port associated with the database connection.

6. The method of claim 1, wherein the contextual information includes one or more of: an operating system (OS) user name associated with the process, a command line instruction that caused the process to be executed, one or more activation parameters associated with the process, an application name associated with the process, a host name of a host executing the process, and authentication information.

7. The method of claim 1, wherein the network device implements an application server, and wherein the application server executes a plurality of processes that create database connections to the database server to serve application clients.

8. The method of claim 1, wherein the network device implements a jump server, and wherein the process is executed by the jump server on behalf of an end user that is to access the database server via the jump server.

9. The method of claim 8, wherein the contextual information includes an Internet Protocol (IP) address associated with the end user.

10. The method of claim 1, wherein the information included in the database log of the database includes a database name of the database, a database user name of a database user, and information regarding a database query submitted by the database user.

11. A set of one or more non-transitory machine-readable storage media storing instructions which, when executed by one or more processors of one or more network devices communicatively coupled to a database server hosting one or more databases, causes the one or more network devices to perform operations for providing contextual information for database logs, the operations comprising:
    detecting that a process executing on the network device has created a database connection to the database server;
    determining a process ID of the process that created the database connection to the database server in response to detecting that the process has created the database connection;
    determining contextual information using the process ID of the process;
    generating a key associated with the database connection based on information that is known to be included in a database log of a database from the one or more databases hosted by the database server; and
    providing the key and the contextual information to a correlator component, wherein the correlator component is to correlate information included in the database log of the database with the contextual information based on the key to generate an enriched database log that correlates the information included in the database log with the contextual information.

12. The set of one or more non-transitory machine-readable storage media of claim 11, wherein the key is generated based on a connection ID associated with the database connection.

13. The set of one or more non-transitory machine-readable storage media of claim 12, wherein the key is further generated based on a database instance ID.

14. The set of one or more non-transitory machine-readable storage media of claim 11, wherein the key is generated based on a source Internet Protocol (IP) address and source port associated with the database connection.

15. The set of one or more non-transitory machine-readable storage media of claim 11 wherein the contextual information includes one or more of: an operating system (OS) user name associated with the process, a command line instruction that caused the process to be executed, one or more activation parameters associated with the process, an application name associated with the process, a host name of a host executing the process, and authentication information.

16. A network device configured to provide contextual information for database logs, wherein the network device is to be communicatively coupled to a database server hosting one or more databases, the network device comprising:
   one or more processors; and
   a non-transitory machine-readable storage medium having instructions stored therein, which when executed by the one or more processors, causes the network device to:
      detect that a process executing on the network device has created a database connection to the database server;
      determine a process ID of the process that created the database connection to the database server in response to detecting that the process has created the database connection;
      determine contextual information using the process ID of the process;
      generate a key associated with the database connection based on information that is known to be included in a database log of a database from the one or more databases hosted by the database server; and
      provide the key and the contextual information to a correlator component, wherein the correlator component is to correlate information included in the database log of the database with the contextual information based on the key to generate an enriched database log that correlates the information included in the database log with the contextual information.

17. The network device of claim 16, wherein the key is generated based on a connection ID associated with the database connection.

18. The network device of claim 16, wherein the key is generated based on a source Internet Protocol (IP) address and source port associated with the database connection.

19. The network device of claim 16, wherein the network device implements an application server, and wherein the application server executes a plurality of processes that create database connections to the database server to serve application clients.

20. The network device of claim 16, wherein the network device implements a jump server, and wherein the process is executed by the jump server on behalf of an end user that is to access the database server via the jump server.

* * * * *